United States Patent [19]

Ritola

[11] 3,927,755
[45] Dec. 23, 1975

[54] SORTING APPARATUS WITH ROTATING ARTICLE DIVERTER

[75] Inventor: Edward W. Ritola, Yacolt, Wash.

[73] Assignee: Lumber Systems, Inc., Portland, Oreg.

[22] Filed: Mar. 6, 1974

[21] Appl. No.: 448,491

[52] U.S. Cl. ...................... 198/25; 198/38; 198/81; 198/185
[51] Int. Cl.² .......................................... B65G 47/00
[58] Field of Search ............. 209/74 R, 125, 72, 73, 209/90, 91; 198/20 R, 25, 72, 81, 185, 38

[56] References Cited
UNITED STATES PATENTS

| | | | |
|---|---|---|---|
| 1,056,767 | 3/1913 | Allison | 198/25 |
| 2,858,929 | 11/1958 | Vamvakas | 198/25 |
| 3,144,926 | 8/1964 | Edelman | 198/38 |
| 3,647,063 | 3/1972 | Rowley | 209/74 R |
| 3,782,527 | 1/1974 | Petershack | 198/25 |

*Primary Examiner*—Allen N. Knowles
*Attorney, Agent, or Firm*—Kolisch, Hartwell, Dickinson & Stuart

[57] ABSTRACT

Sorting apparatus including an elongate conveyor having lugs thereon for carrying articles along a path, and a plurality of article receivers at sorting stations spaced along the path. A plurality of diverting cams are disposed adjacent the conveyor, with one of such cams being positioned adjacent each of the sorting stations. Each of the cams is rotatable in one direction between a nondiverting position wherein it is completely below the carrying surface of the conveyor, a diverting position in which its peripheral surface projects above the carrying surface of the conveyor for diverting an article from the conveyor, and thence to a nondiverting position. The cams are operatively connected to the conveyor drive through clutches. The clutch which interconnects a cam to the drive is actuatable to rotate its associated cam only in a preselected timed sequence relative to conveyor movement. An elongate transition member is positioned adjacent the upstream side of a cam and provides an inclined transition for an article to ride up onto the cam periphery when the cam is in a diverting position.

17 Claims, 5 Drawing Figures

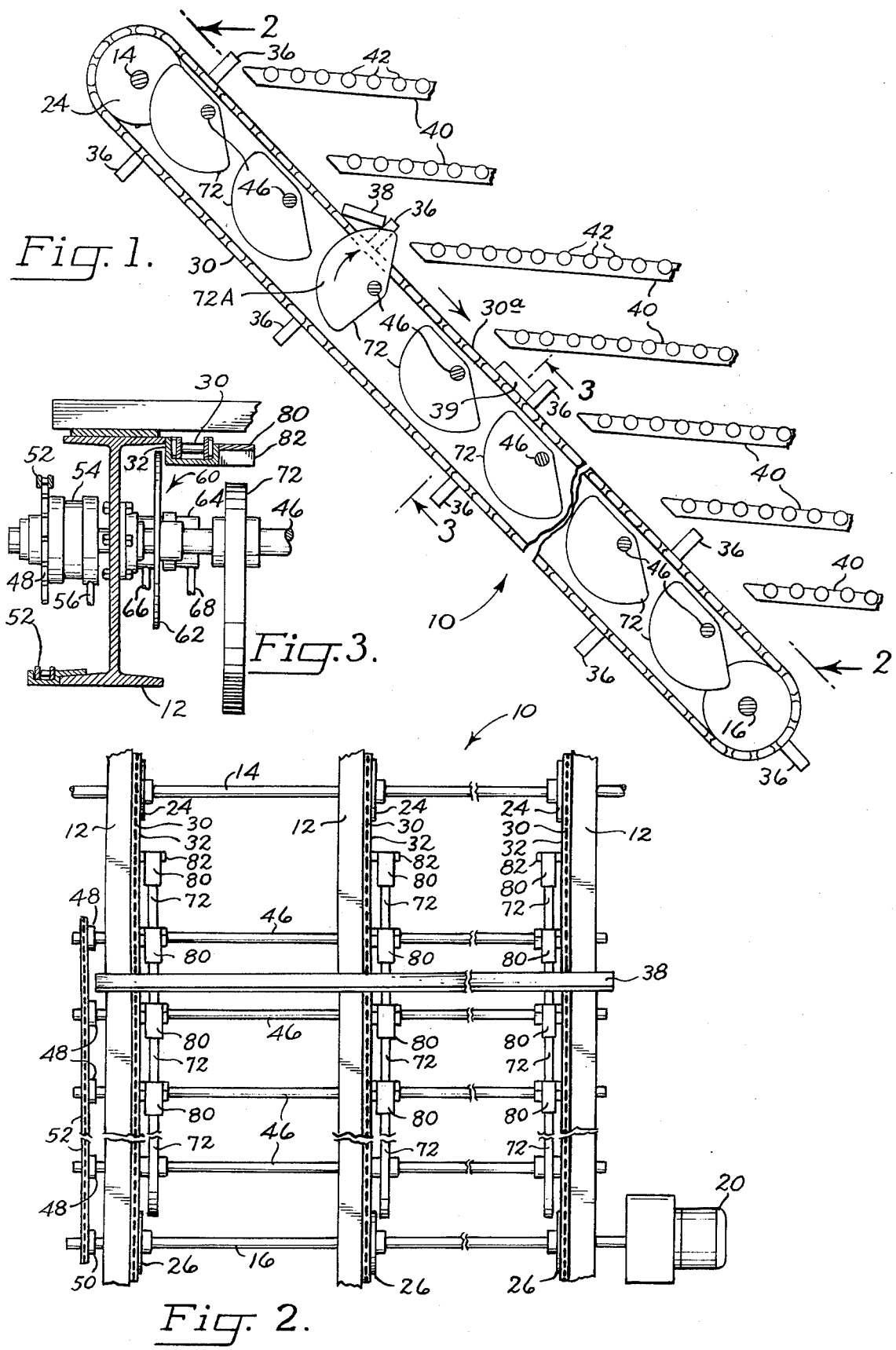

SORTING APPARATUS WITH ROTATING ARTICLE DIVERTER

BACKGROUND AND SUMMARY OF THE INVENTION

This invention relates to diverter means, and more specifically to sorting apparatus incorporating rotating cams as diverters.

In the past, various types of sorting apparatus have been devised for use in lumber handling, and in other industries. Various styles of diverters have been used with such sorters for diverting an article from a conveyor into a selected sorting station.

Such past diverters generally have included elongate arms, each mounted for pivoting about one of its ends, either for dropping out from under an article to drop it into a sorting station and then returning to its original position, or being pivoted into a position projecting into the path of an article and diverting it into a station. Such diverter arms in past designs must be swung under power to a diverting position, stopped, and then their movement must be reversed to return them to a nondiverting position. Such diverters have not been entirely successful since the speed of the apparatus is limited by the need to initiate movement of the diverter arm from its nondiverting toward its diverting position, as it nears its diverting position retarding its movement, bringing it to a stop, and then once again initiating movement from its diverting position toward its nondiverting position.

A general object of the present invention is to provide novel diverting means for use in sorting apparatus which is simple and economic to construct, yet which provides greater speed of operation than has been possible with past diverters.

More specifically, an object of the present invention is to provide a novel diverter which includes a rotating cam which is rotatable in one direction from a nondiverting position to a diverting position projecting into a path along which articles may be conveyed, and thence to a nondiverting position. With such construction, the apparatus may be operated much more quickly than past devices since there is no need to retard movement of the diverter element and bring it to a stop once it reaches its diverting position and then reverse its direction to return it to a nondiverting position.

Another object is to provide a novel sorter including a conveyor for carrying articles along a path and rotating diverter cams which are operatively connected to drive means for the conveyor in such a manner that the cam is operated in a preselected time relationship corresponding to movement of the conveyor.

Yet another object of the invention is to provide such a novel sorter in which the cam rotates in such a direction that its periphery moves generally in the direction of the conveyor, thus to enable it to utilize the momentum of an article carried by the conveyor in the furtherance of diverting the article.

A still further object of the invention is to provide such a novel sorter which includes a transition element which normally lies below the carrying surface of the conveyor, but which is raised on operation of the cam to form an incline plane up which an article may ride onto the cam element and thence into a sorting station on being diverted from the conveyor.

DRAWINGS

These and other objects and advantages will become more fully apparent as the following description is read in conjunction with the drawings, wherein:

FIG. 1 is a somewhat schematic side elevation view of sorting apparatus according to the invention;

FIG. 2 is a somewhat schematic view, taken generally along the line 2—2 in FIG. 1 of the apparatus, with portions broken away;

FIG. 3 is an enlarged cross-sectional view taken generally along the line 3—3 illustrating a cam, a transition member, and clutch and brake means in the apparatus;

DETAILED DESCRIPTION OF AN EMBODIMENT OF THE INVENTION

Figure 4:
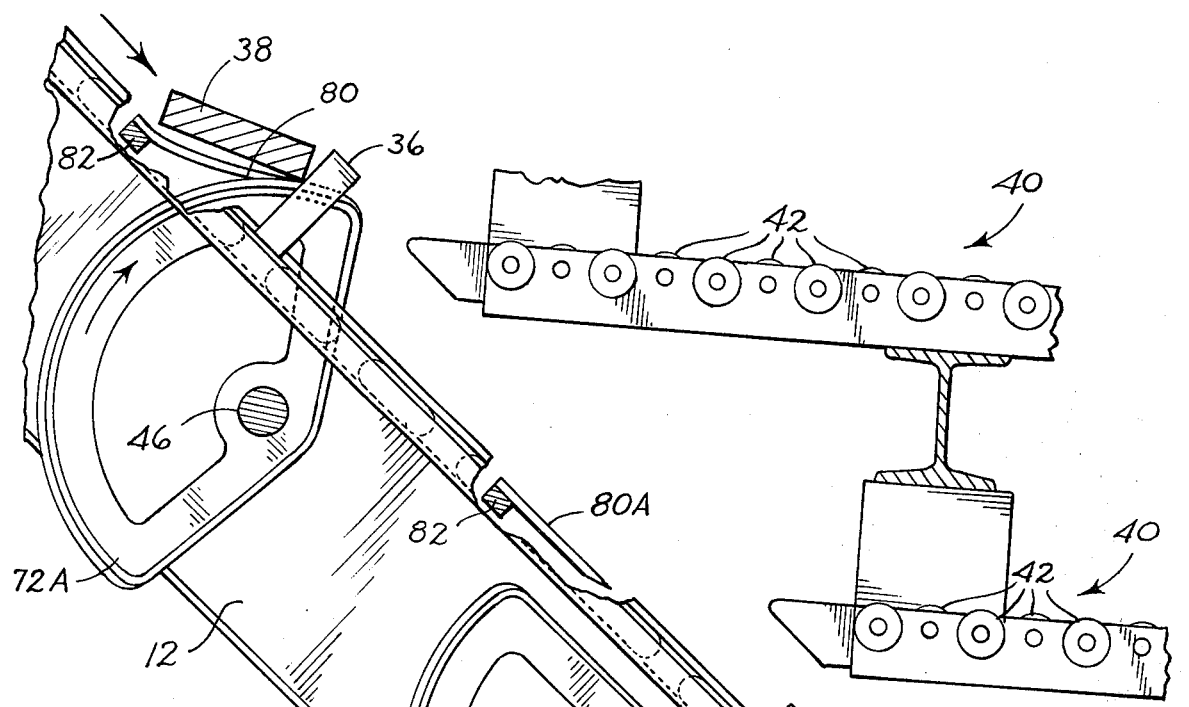
FIG. 4 is an enlarged side elevation view of a portion of the apparatus illustrated in FIG. 1, showing one of the cams in a diverting position.

Referring to the drawings, and first more specifically to FIGS. 1 and 2, at 10 is indicated generally sorting apparatus constructed according to an embodiment of the invention. As is seen in FIG. 2, the sorting apparatus includes a plurality of elongate, substantially parallel, laterally spaced I-beams 12, one of which is illustrated generally in cross section on an enlarged scale in FIG. 3. Beams 12 are inclined at approximately a 45° angle to the horizontal. Beams 12 form a portion of a support frame for the apparatus.

Referring still to FIG. 2, supported and journaled for rotation on beams 12 are an upper support shaft 14 and a lower drive shaft 16. As is illustrated in FIG. 2, drive shaft 16 is operatively connected to the output shaft of a variable speed motor 20. Sprockets 24, 26 are secured on shafts 14, 16, respectively, adjacent each of beam 12.

Trained over sprockets 24, 26 are elongate, endless, conveyor chains 30. As is illustrated in FIGS. 2 and 3, an elongate channel 32 is secured to and extends along each of beams 12. Each channel 32 is operable to support upper reach 30a of a chain 30 as it travels in an inclined path paralleling beams 12.

A plurality of lugs 36 are secured to and project outwardly at preselected spaced intervals along chains 30. The lugs on each of chains 30 are spaced at like intervals, and the chains are so aligned on their respective sprockets that the lugs thereon are aligned in a direction extending transversely of the apparatus.

Conveyor chains 30, and lugs 36, are adapted to receive and carry articles, such as elongate boards 38, 39, along an inclined path downwardly along the conveyor.

Supported adjacent upper reaches 30a of the conveyor chains are a plurality of vertically spaced receivers 40 which are disposed at a plurality of sorting stations in the apparatus. As is seen in FIGS. 1 and 4, receivers 40 have rollers 42 journaled thereon over which articles, such as boards, may roll when diverted onto the receivers.

A plurality of elongate, substantially parallel, laterally spaced shafts 46 are disposed intermediate and substantially parallel to shafts 14, 16 in the apparatus. Shafts 46 are journaled on beams 12 below upper reaches 30a of chains 30. As is best seen in FIGS. 2 and 3, each of shafts 46 has an end portion which extends outwardly, beyond the I-beam at the extreme left side of FIG. 2.

Each shaft 46 has a clutch mechanism 54 mounted thereon (see FIG. 3). A clutch mechanism 54 includes a first portion secured to shaft 46 for rotation therewith and a second portion which is mounted for rotation either freely relative to shaft 46 when the clutch is disengaged or which is connected to the shaft through the first portion for rotation therewith on engagement of the clutch.

A sprocket 48 is secured to the second portion of the clutch mechanism which either rotates freely relative to or rotates with shaft 46 dependent upon whether the clutch is engaged or not. A sprocket 50 is secured to shaft 16 in line with sprockets 48. An elongate, endless, drive chain 52 is trained over sprockets 48, 50, and thus a common drive is provided between conveyor chain 30 and sprockets 48.

Clutch 54 is a single position, air actuated type that can be engaged only in one position, ensuring that the shaft 46 to which it is connected will be rotated only in a preselected timed relation with movement of chain 30. A clutch which has been found to work well in the apparatus illustrated is a Horton single position clutch No. 5H50P-SP. When disengaged the clutch parts run freely, and when engaged sprocket 48 and shaft 46 will be rotated together. An air supply conduit 56 connected to clutch 54 is operable to supply air under pressure to the clutch for engaging the same. When air under pressure is released from conduit 56, the clutch rotates shaft 46 to a preselected position and then disengages.

Still referring to FIG. 3, associated with each of shafts 46 is a caliper disc brake, such as that indicated generally at 60. The brake includes a disc element 62 secured to shaft 46, and a caliper braking assembly indicated generally at 64 secured to beam 12. A pair of air pressure supply conduits 66, 68 are operatively connected to brake assembly 64 in such a manner that air under pressure may be supplied to or exhausted from the brake assembly to provide a braking force on disc element 62 and shaft 46, or release such braking force.

Although it is not illustrated, it should be understood that conduits 56, 66, 68 are connected to a source of air under pressure through an electrically operated air valve in such a manner that switching of the valve to one position engages the brake and disengages the clutch, while switching of the valve to another position disengages the brake and engages the clutch. Clutch 54 is so constructed that it will engage only at one position, and will disengage only after it has rotated through a preselected angle of rotation.

Secured to each of shafts 46 are a plurality of identical cams 72, with each of said cams adjacent a beam 12. As is seen in the illustrations, each of cams 72 when viewed along a line paralleling the axis of shafts 46, which also is the axis of rotation for a cam, has a projecting lobe thereon which defines a segment of a circle.

All of the cams on a shaft 46 are aligned with each other as viewed in a direction longitudinally of the shaft. As is seen in FIGS. 2 and 3, cams 72 are spaced to the sides of their associated conveyor chains 30 so that during operation, as will be described in detail below, the cams and conveyor chains do not interfere with each other.

The shapes of cams 72 are such that when a shaft 46 and its associated cams are in a nondiverting position, as shown for a majority of the cams in FIG. 1, the cams are fully below the upper, or article carrying surface, of reach 30a of the chain. On rotation of a shaft 46, in a clockwise direction as illustrated in FIGS. 1 and 4, the cams associated with that shaft rotate to diverting positions, as shown for cam 72A, wherein a peripheral portion of the cam projects above the upper surface of reach 30a of the conveyor chain. Cam 72A when in a diverting position projects into the path along which articles are carried by the conveyor chain. Continued rotation of the shaft in the one direction returns its associated cams to nondiverting positions disposed totally below the upper surface of the conveyor chain.

Referring to FIGS. 2, 3 and 4, disposed adjacent, and on the upstream side of, each of cams 72 is an elongate, flexible, plastic spring, or transition member, 80. A support member 82 is secured to channel 32, or alternately to beam 12, and projects outwardly therefrom into a region on the upstream side of a cam 72. The upstream end of spring 80 is secured to support member 82 in such a manner that when the spring is in a normally at-rest position, as seen for spring 80A in FIG. 4, it lies substantially flat beneath the upper, article supporting surface of reach 30a of the conveyor chain. As a cam is rotated, as seen in FIG. 4 at 72A, the downstream end of spring 80 rides up and onto the periphery of its associated cam to be lifted above the upper surface of reach 30a of the conveyor chain to form an inclined, transition surface over which an article may move from the upper surface of the conveyor chain to the periphery of the cam.

Conventional control mechanism may be used with such a sorting and diverter system to determine onto which of receivers 40 an article, such as a board, is to be diverted. Such a control system must be capable of providing a signal for actuating of the valve which controls brake 60 and clutch 54 associated with a sorting station to which a board is to be directed. Such actuation must occur prior to the board reaching a position on the conveyor adjacent to the selected sorting station.

Describing the operation of such apparatus, boards, such as those indicated generally at 38, 39 are carried along a downwardly inclined path by conveyor chains 30 and lugs 36 thereon. When a cam is in its nondiverting positions, as illustrated for the majority of the cams in FIG. 1, the clutch associated with that cam is disengaged and the brake associated therewith is engaged to hold the cam in a nondiverting position. Assuming that board 38 is to be diverted onto the receiver of the sorting station adjacent cam 72A, a signal from the control mechanism is directed to the air valve connected to conduits 56, 66, 68 of the brake and clutch associated with cam 72A to disengage the brake and engage the clutch. Disengagement of brake 60 and engagement of clutch 54 should occur when lugs 36 carrying board 38 are in a position spaced a distance upstream from cam 72A.

As cam 72A rotates in a clockwise direction as seen in FIGS. 1 and 4, its peripheral edge rises above the upper surface of chain reach 30a and into the path of board 38. Spring 80 is biased upwardly to form an inclined transition between the conveyor chain and the periphery of cams 72A, as is best illustrated in FIG. 4.

Figure 5:
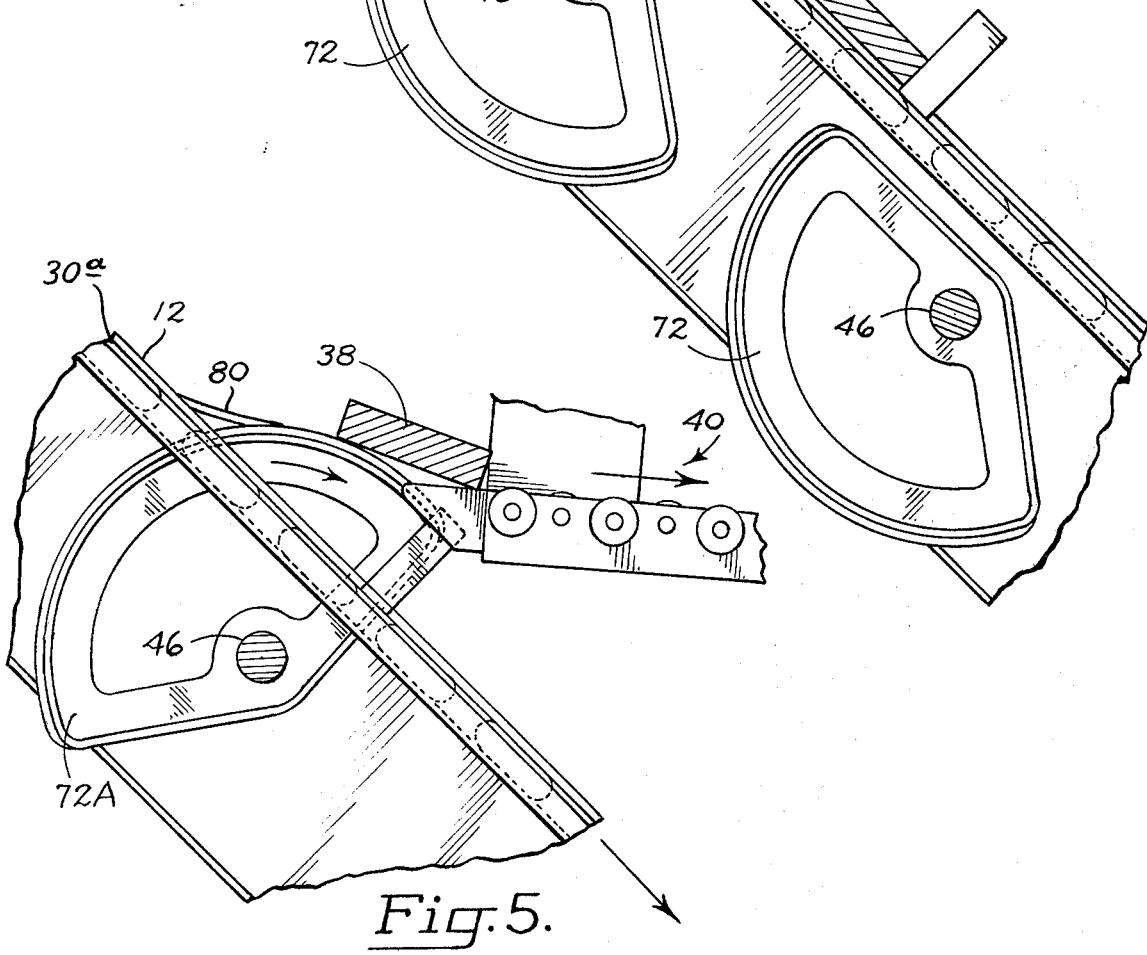
FIG. 5 is a view of the operational diverter cam of FIG. 4 in a position rotated further throughout its operation.

As board 38 approaches cam 72A, its momentum carries its leading edge along transition spring 80 and up and onto the peripheral edge of cam element 72 projecting into the path of the board. As cam 72A is rotated further, the movement of its peripheral edge and the momentum of board 38 divert the board at an angle less than 90° from the path of conveyor 30 onto receiver 40, as is illustrated in FIG. 5.

As has been discussed previously, clutch 54 is operatively interconnected through drive chain 52 to the same motor 20 which drives conveyor chain 30. Further, clutch 54 is operable for engagement only in a single position, which position is such that it corresponds to a selected position of the lugs on chain 30. Explaining further, clutch 54 on receiving an actuating signal will engage only at a time when a lug 36 on chain 30 is spaced a preselected distance upstream from the cam which is to divert a board therefrom. The engagement of the clutch and the speed of rotation of the cams associated therewith correspond to movement of the conveyor chain in such a manner that the cams which are to divert the board are raised to a diverting position only slightly prior to the board arriving at the cams. Continued rotation of the cams is properly timed corresponding to the movement of the conveyor chain to carry the board at a preselected speed onto a receiver at a sorting station. The actuating means for the clutch and the clutch itself are so constructed that the clutch is disengaged and the brake is engaged for stopping the cams after the cams have been rotated in one direction from nondiverting to diverting, and thence to nondiverting positions, thus to await subsequent signals to divert other boards onto its associated sorting station.

As has been described, motor 20 drivingly connected to conveyor chains 30 and operatively connected to clutches 54 is a variable speed motor. Since clutches 54 and chains 30 are operatively connected to the same motor, variations in the speed of the conveyor are accompanied by corresponding variations in the speed of actuation of the diverters, whereby diverters act in a preselected time relationship relative to the conveyor.

While a preferred embodiment of the invention has been described herein, it should be apparent to those skilled in the art that variations and modifications are possible without departing from the spirit of the invention.

It is claimed and desired to secure by Letters Patent:

1. Sorting apparatus comprising an elongate conveyor for carrying articles along a path past a plurality of sorting stations spaced apart in the direction of movement for an article along said path, and diverting means for diverting selected ones of said articles to selected sorting stations, said diverting means comprising a plurality of rotatable cams spaced longitudinally of said path, with one of said cams disposed adjacent each of said sorting stations, a cam having a projecting lobe thereon and being mounted adjacent said path for rotation between a nondiverting position in which said lobe is spaced from said path to permit articles to move therepast on said conveyor and a diverting position in which said lobe projects into said path to engage and divert an article from said path into a sorting station, and operating means for rotating said cam in one rotational direction from a nondiverting position to a diverting position and thence continuing in said one rotational direction to a nondiverting position spaced from said path.

2. The apparatus of claim 1, wherein said conveyor comprises an elongate conveyor element having a plurality of article carrying means spaced therealong for carrying articles along said path, drive means for moving said conveyor element and article carrying means at selectively variable speeds along said path past said sorting stations, and said operating means comprises means interconnecting said drive means and said cams for producing rotation of a selected cams in a selected one of said timed sequence relative to the speed of movement of said conveyor and relative to the position of an article carrying means on said conveyor element.

3. The apparatus of claim 1, wherein said operating means comprises clutch means associated with each of said cams operable upon actuation to initiate rotation of its associated cam from a nondiverting toward a diverting position only when an article carrying means on said conveyor is in a preselected position relative to said cam.

4. The apparatus of claim 3, wherein said preselected position for a carrying means on said conveyor is a position spaced a distance upstream along said path from the sorting station adjacent said cam.

5. The apparatus of claim 1, wherein a cam element is so disposed in the apparatus that when it is in a diverting position it may engage an article in a region upstream in said path from its associated sorting station and said operating means rotates the cam in such a direction that the periphery of the cam when rotated through its diverting position moves generally in the direction of said path whereby momentum of an article carried along the path is available to aid in diverting the same to a selected sorting station.

6. The apparatus of claim 5, wherein the periphery of said cam when in a diverting position defines with said conveyor an angle less than 90° facing in a downstream direction relative to said conveyor path.

7. The apparatus of claim 1, which further comprises drive means for driving said conveyor at selectively variable speeds and said operating means includes means interconnecting said drive means and cam for producing operation of said cam in a selected timed sequence relative to movement of said conveyor means.

8. Apparatus for carrying articles along a path and selectively diverting articles from the path of travel comprising a conveyor for carrying an article in one direction along said path, and diverter means including a rotatable cam having a projecting lobe thereon, said cam being mounted adjacent said path for rotation between a nondiverting position spaced to one side of said path and a diverting position in which said lobe projects into said path to engage and divert an article from said path, operating means for rotating said cam in one direction from a nondiverting position to a diverting position and thence to a nondiverting position spaced from said path, and an elongate transition member mounted adjacent said one side of the path and disposed on the upstream side of said cam, said transition member being shiftable between a first position when said cam is in a nondiverting position and a second position when the cam is in a diverting position, said transition member when in its first position being disposed fully to said one side of said path and when in its second position inclining progressively outwardly into said path on progressing in a downstream direction relative to said path to provide an inclined transition along which an article is directed as it is diverted from said path.

9. Apparatus for carrying articles along a path and selectively diverting articles from the path of travel comprising a conveyor for carrying an article in one direction along said path, diverter means including a rotatable cam having a projecting lobe thereon, said cam being mounted adjacent said path for rotation between a nondiverting position spaced to one side of said path and a diverting position in which said lobe projects into said path to engage and divert an article from said path, and operating means for rotating said cam in one direction from a nondiverting position to a diverting position and thence to a nondiverting position spaced from said path, a support frame, and an elongate transition member connected adjacent one of its ends to said frame in a region on the same side of said path as the cam and spaced from said cam in an upstream direction relative to said path from said cam, with remainder portions of said transition member extending generally in the direction of said path and with the opposite end portion of said transition member interposed between said cam and said path, said transition member being mounted for movement between a first position spaced fully to said one side of said path when the cam is in a nondiverting position and a second position inclining gradually from its connection with the frame to a region supported on a peripheral portion of said cam when said cam is rotated to a diverting position, said transition member in its second position providing an inclined transition along which an article is directed as it is diverted from said path.

10. The apparatus of claim 9, wherein said transition member comprises an elongate flexible element.

11. Sorting apparatus comprising an elongate conveyor including an elongate conveyor element having an upper surface for supporting and carrying articles along a path past a plurality of sorting stations spaced apart longitudinally of said path, and diverting means for diverting selected ones of said articles to selected sorting stations, said diverting means comprising a plurality of rotatable cams spaced apart longitudinally of said path, with one of said cams disposed adjacent each of said sorting stations, a cam having a projecting lobe thereon and being mounted adjacent said path for rotation about an axis spaced beneath said upper surface of the conveyor element between a nondiverting position in which said lobe is spaced from said path and a diverting position in which said lobe projects into said path to engage and divert an article from said path into a sorting station, and operating means for rotating said cam independently of rotation of the remainder of said cams in one direction about said axis with rotation of the cam about said axis moving said lobe between a position spaced below the upper surface of said conveyor element to a position projecting above said upper surface for lifting an article from said conveyor element and diverting it from said path.

12. Sorting apparatus comprising an elongate conveyor for carrying articles along a path past a plurality of sorting stations, and diverting means for diverting selected ones of said articles to selected sorting stations, said diverting means comprising a plurality of rotatable cams, with one of said cams disposed adjacent each of said sorting stations, a cam having a projecting lobe thereon and being mounted adjacent said path for rotation between a nondiverting position in which said lobe is spaced from said path and a diverting position in which said lobe projects into said path to engage and divert an article from said path into a sorting station, operating means for rotating said cam in one direction from a nondiverting position to a diverting position and thence to a nondiverting position spaced from said path, and an elongate transition member mounted adjacent said one side of the path and disposed on the upstream side of said cam, said transition member being shiftable between a first position when said cam is in a nondiverting position and a second position when the cam is in a diverting position, said transition member when in its first position being disposed fully to said one side of said path and when in its second position inclining progressively outwardly into said path on progressing in a downstream direction relative to said path to provide an inclined transition along which an article is directed as it is diverted from said path.

13. The apparatus of claim 12, wherein said transition member comprises an elongate flexible element.

14. Sorting apparatus comprising
an elongate inclined conveyor for carrying articles downwardly along an inclined path past a plurality of sorting stations spaced apart longitudinally of said path, receiving means at said sorting stations adapted to receive articles diverted from said conveyor and carry the same away from said conveyor, and diverting means for diverting selected ones of said articles to selected sorting stations, said diverting means comprising a plurality of rotatable cams spaced apart longitudinally of said path, with one of said cams disposed adjacent each of said sorting stations, a cam having a projecting lobe thereon and being mounted adjacent said path for rotation between a nondiverting position in which said lobe is spaced from said path and a diverting position in which said lobe projects into said path to engage and divert an article from said path into a sorting station, and operating means for rotating said cam independently of rotation of the remainder of said cams in one direction from a nondiverting position to a diverting position and thence to a nondiverting position spaced from said path, said cam being rotated in such direction that its peripheral edge may lift an article from said conveyor and carry it in a direction extending at an angle less than 90° from said conveyor and deposit such article on said receiving means of its associated sorting station.

15. Apparatus for carrying articles along a path and selectively diverting articles from said path comprising a conveyor for carrying an article in one direction along said path, drive means for moving said conveyor at selectively variable speeds, and diverter means including a rotatable cam having a projecting lobe thereon, said cam being mounted adjacent said path for rotation between a nondiverting position spaced to one side of said path and a diverting position in which said lobe projects into said path to engage and divert an article from said path, and operating means for rotating said cam in one rotational direction from a nondiverting position to a diverting position and then continuing in said one rotational direction to a nondiverting position spaced from said path, said operating means comprising selectively engageable clutch means interposed between said drive means and said cam, said clutch being normally disengaged with said cam resting in a nondiverting position, and upon engagement being operable to produce rotation of said cam in a preselected timed sequence relative to movement of said conveyor.

16. Apparatus for carrying articles along a path and selectively diverting articles from the path of travel comprising a conveyor for carrying an article in one direction along said path, drive means for moving said conveyor at selectively variable speeds, and diverter means including a rotatable cam having a projecting lobe thereon, said cam being mounted adjacent said path for rotation between a nondiverting position spaced to one side of said path and a diverting position in which said lobe projects into said path to engage and divert an article from said path, and operating means for rotating said cam in one rotational direction from a nondiverting position to a diverting position and then continuing in said one rotational direction to a nondiverting position spaced from said path, said operating means comprising selectively engageable clutch means interposed between said drive means and said cam being normally disengaged with said cam resting in a nondiverting position, and upon engagement being operable to produce rotation of said cam in a preselected timed sequence relative to movement of said conveyor, with said cam being rotated through a preselected angular rotation and then disengaged, and brake means operatively connected to said cam for stopping and holding the same in the position to which it is rotated when said clutch means is disengaged.

17. The apparatus of claim 16, wherein the periphery of said cam when viewed along a line parallel to the axis of rotation for the cam defines a segment of a circle.

* * * * *